United States Patent
Naganuma

(10) Patent No.: US 6,525,499 B2
(45) Date of Patent: Feb. 25, 2003

(54) SYSTEM FOR CONTROLLING VEHICLE POWER SLIDING DOOR

(75) Inventor: Tsukasa Naganuma, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/803,136

(22) Filed: Mar. 12, 2001

(65) Prior Publication Data

US 2001/0024093 A1 Sep. 27, 2001

(30) Foreign Application Priority Data

Mar. 15, 2000 (JP) ........................................ 2000-071944
Mar. 15, 2000 (JP) ........................................ 2000-071946

(51) Int. Cl.$^7$ ................................................. H02P 7/00
(52) U.S. Cl. ........................... 318/445; 318/286; 49/28; 49/26
(58) Field of Search ................................ 318/445, 286; 49/28, 26

(56) References Cited

U.S. PATENT DOCUMENTS

| | | | | |
|---|---|---|---|---|
| 4,916,861 A | * | 4/1990 | Schap | 296/155 |
| 5,434,487 A | * | 7/1995 | Long et al. | 318/280 |
| 5,551,190 A | * | 9/1996 | Yamagishi et al. | 49/280 |
| 5,801,502 A | * | 9/1998 | Monzen | 318/266 |
| 6,134,836 A | * | 10/2000 | Kawanobe et al. | 340/825.69 |
| 6,164,015 A | * | 12/2000 | Kawanobe et al. | 49/360 |

FOREIGN PATENT DOCUMENTS

| | | |
|---|---|---|
| JP | 7-229344 | 8/1995 |
| JP | 8-144633 | 6/1996 |
| JP | 9-328961 | * 9/1997 |
| JP | 9-328960 | 12/1997 |

OTHER PUBLICATIONS

PCT Publication No. 09–317326, Publication date Sep. 12, 1997. Inventor–Watanabe, Mitsuhiro. The document has been translated by the computer. So the translation may not reflect the original precisely.*

* cited by examiner

Primary Examiner—Rita Leykin
(74) Attorney, Agent, or Firm—Arent Fox Kintner Plotkin & Kahn, PLLC

(57) ABSTRACT

A system for controlling a vehicle power sliding door having a motor supplied voltage from a power source mounted on the vehicle for opening or closing the power sliding door and a motor drive circuit for driving the motor with relays for switching direction of rotation of the motor and a FET for regulating the voltage to be supplied to the motor to change a speed of the motor rotation. In the system, a motor-drive-circuit controller is provided for outputting a command value to the motor drive circuit, thereby enabling to control the direction of rotation of a power sliding door drive motor to effect opening and closing of the power sliding door with minimal total heat loss of semiconductor devices and that, by utilizing PWM control for varying motor rotational speed, lowers product cost by decreasing the size, weight and total number of components of the power sliding door unit. In addition, the faulty operation of the controller is also detected.

7 Claims, 18 Drawing Sheets

FIG. 16

|  | 1 | 2 | 3 | 4 | 5 |
|---|---|---|---|---|---|
| FET/H BRIDGE CIRCUIT (PRIOR ART) | PROTECTIVE REVERSE DIODE | FET | MOTOR | FET | |
| | PROTECTIVE REVERSE DIODE  10W | ON RESISTANCE × CURRENT × CURRENT  1.5W | | ON RESISTANCE × CURRENT × CURRENT HEAT LOSS OF SWITCHING  6W | 17.5W |
| HYBRID CIRCUIT (THIS INVENTION) | | RELAY | MOTOR | RELAY | FET |
| | | RELAY RESISTANCE × CURRENT × CURRENT  0.2W | | CONTACT RESISTANCE × CURRENT × CURRENT  0.2W | ON RESISTANCE × CURRENT × CURRENT HEAT LOSS OF SWITCHING  6W  6.4W |

SYSTEM FOR CONTROLLING VEHICLE POWER SLIDING DOOR

BACKGROUND OF THE INVENTION

1. Field of the Invention

This invention relates to a system for controlling a vehicle power sliding door, particularly to a system for controlling a power sliding door of a vehicle equipped with switching relays and a field effect transistor (FET) and capable of opening and closing a power sliding door by controlling the rotational speed and direction of rotation of a motor for driving the power sliding door.

2. Description of the Related Art

Japanese Patent Laid-Open Applications Hei 7(1995)-229344 and Hei 8(1996)-144633, for example, teach vehicle power sliding door control systems that are equipped with a sliding door installed to slide along one side of the vehicle and a motor or other source of driving power and is capable of opening and closing the sliding door automatically.

The diagram of FIG. 20 shows the basic configuration of the motor drive circuit for controlling the direction of rotation of the motor in the conventional systems (forward rotation for opening the door and reverse rotation for closing it). As shown in FIG. 20, the motor drive circuit includes a first relay 104 having a switching relay 100 switched by a coil 102 and a second relay 110 having a switching relay 106 switched by a coil 108.

The first and second relays 104 and 106 are connected to a first power source 112 that supplies them with a voltage of, for instance, about 12 V, and their outputs are connected to the positive and negative poles of a motor (designated M) 114. The coils 102 and 108 are connected to a second power source 116 that supplies them with a voltage of, for instance, about 12V and are further connected to the A (output port) and B (output port) of a controller 118. The controller 118 controls the level of the current passing through the coils to different combinations of Hi (to close the relays) and Lo (to open the relays). By this, as shown in FIG. 21, the direction of rotation (forward/reverse) of the motor 114 is controlled. C, D, E and F in FIG. 20 and FIG. 22 (referred to below) are detection resistances that indicate the driven state of the motor 114.

Japanese Patent Laid-Open Application Hei 9(1997)-328960 teaches a system in which an H bridge circuit configured by use of field effect transistors (FETs) produces a pulse signal for PWM (pulse-width modulation)-controlling current from a battery to enable directional and speed control of a motor.

The diagram of FIG. 22 shows the basic configuration of the motor drive circuit of the power sliding door control system using FETs.

In the motor drive circuit utilizing FETs, four FETs 120 and a motor 122 are connected as illustrated to configure a conventional H bridge circuit and the gates of the FETs 120 are connected to output ports A, B, C and D of a controller 124.

In this motor drive circuit, output of drive pulse signals from the output ports A, B, C and D as shown in FIG. 23 enables production of the indicated detected values at detection resistances E and F, i.e., enables control of motor 122 direction of rotation (forward rotation: solid line, reverse rotation: broken line) and rotational speed. As shown at the A and B outputs in the same figure, by outputting pulse signals it becomes possible to vary the motor rotational speed by PWM control.

Preferably, a vehicle power sliding door should be capable of being opened and closed at different speeds matched to the circumstances at the time of operation and should be capable of being opened and closed at the same speed even when the vehicle is parked or stopped on an incline. However, the foregoing systems utilizing switches, which are characterized by slow relay response of several milliseconds, are incapable of smooth sliding door operation.

While the system that controls the direction of motor rotation by operating FETs incorporated in the motor drive circuit is capable of PWM control, its use of multiple FETs increases the total amount of heat loss of the semiconductor devices to the point of requiring provision of a relatively large radiator (heat sink). The weight of the heat sink and its footprint on the circuit board are therefore proportionally larger. In addition, the size and weight of the power sliding door unit increases, leading to higher product cost.

In the circuit using FETs shown in FIG. 22, moreover, inadvertent reverse connection to the battery is liable to damage the FETs by producing heavy current flow through the FET parasitic diodes. Although it is conceivable to prevent such FET damage by inserting diodes or the like in the vicinity of the current source (battery), this would further increase the total amount of heat loss of the semiconductor devices.

SUMMARY OF THE INVENTION

An object of the present invention is therefore to overcome the aforesaid problems of the prior art by providing a system for controlling a vehicle power sliding door that is capable of controlling the direction of rotation of a power sliding door drive motor to effect opening and closing of the power sliding door with minimal total heat loss of semiconductor devices and that, by utilizing PWM control for varying motor rotational speed, lowers product cost by decreasing the size, weight and total number of components of the power sliding door unit.

Another object of the invention is to provide a system for controlling a vehicle power sliding door that is safe from FET damage even under heavy current flow caused, for example, by application of counter electromotive force.

Further, when detecting whether or not the motor drive circuit of such a vehicle power sliding door control system, which switches the direction (forward/reverse) of motor rotation by use of switching relays and regulates the motor rotational speed by use of the field effect transistor (FET), is operating normally, it is preferable to be able to check the drive circuit operation with simplest possible configuration and without need for operating the motor.

Still another object of the present invention is therefore to achieve such preferable checking capability by providing a system for detecting faulty operation of a vehicle power sliding door that enables current passing through a detection point to be detected and cut off without operating the motor and that is realized using a simply-configured motor drive circuit for opening and closing the vehicle power sliding door.

For realizing this object, in a first aspect of this invention provides a system for controlling a power sliding door of a vehicle, comprising: a motor supplied voltage from a power source mounted on the vehicle for opening or closing the power sliding door; a motor drive circuit for driving the motor having at least a switch for switching direction of rotation of the motor and a switching element for regulating the voltage to be supplied to the motor to change a speed of the motor rotation; and a motor-drive-circuit controller for outputting a command value to the motor drive circuit. In the first aspect the present invention provides a system for controlling a vehicle power sliding door that is capable of controlling the direction of rotation of a power sliding door drive motor to effect opening and closing of the power sliding door with minimal total heat loss of semiconductor devices and that, by utilizing PWM control for varying motor rotational speed, lowers product cost by decreasing the size, weight and total number of components of the power sliding door unit.

In a second aspect, the present invention provides the system further including: means for detecting an opening/closing speed of the power slide door; and wherein the motor-drive-circuit controller regulates the voltage to change the speed of the motor rotation such that the power sliding door is opened or closed at a speed inversely or substantially inversely proportional to the detected speed of the power sliding door. In the second aspect, the present invention provides a system for controlling a vehicle power sliding door that enables the power sliding door to be opened and closed at a steady speed even when, for example, opening/closing is conducted with the vehicle stopped on an incline.

In a third aspect, the present invention provides the system further including a branch which is connected to the ground through a diode such that the diode is connected with its anode on the ground side. In the third aspect, the present invention provides a system for controlling a vehicle power sliding door that is safe from FET damage even under heavy current flow caused, for example, by application of counter electromotive force.

In a fourth aspect, the present invention provides a system for detecting faulty operation of a power sliding door of a vehicle, comprising: a motor supplied voltage from a power source mounted on the vehicle for opening or closing the power sliding door; a power-sliding door controller provided in a motor current supply circuit for supplying current to the motor having at least a switch for switching direction of rotation of the motor and a switching element for regulating the voltage to be supplied to the motor to change a speed of the motor rotation; current detecting means for detecting supply of current to the motor; and faulty operation detecting means for detecting that faulty operation has occurred in the power-sliding door controller. In the fourth aspect, the present invention provides a system for detecting faulty operation of a vehicle power sliding door that, while being of simple configuration, enables abnormal current passing through the circuit to be detected and cut off without operating the motor.

In a fifth aspect, the present invention provides the system wherein the faulty operation detecting means detects that the faulty operation has occurred in the power-sliding door controller if the current detecting means detects the supply of current to the motor when predetermined outputs are supplied to the switch and the switch element. In the fifth aspect, the present invention provides a system for detecting faulty operation of a vehicle power sliding door that can efficiently detect and isolate shorts arising between the relay lines, between relay lines and ground, and so on.

BRIEF DESCRIPTION OF THE DRAWINGS

FIG. 16 is a table comparing heat loss between a conventional FET/H bridge configuration and the configuration according to the present invention;

DETAILED DESCRIPTION OF THE PREFERRED EMBODIMENTS

System for controlling a vehicle power sliding door according to embodiments of the present invention will now be explained with reference to the attached drawings.

Figure 1:
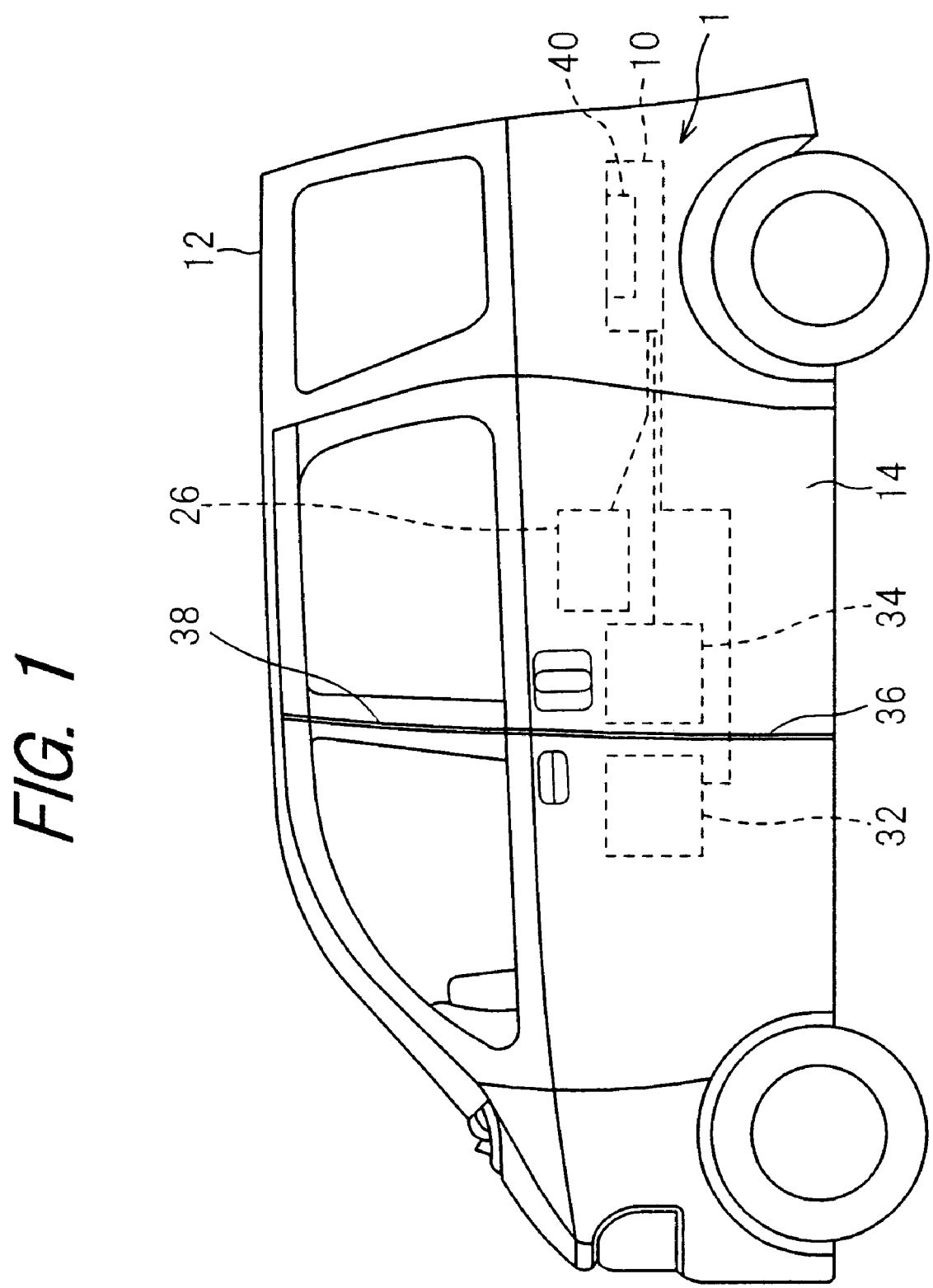
FIG. 1 is an overall schematic diagram showing a vehicle installed with a system for controlling a vehicle power sliding door according to an embodiment of the present invention.
Figure 2:
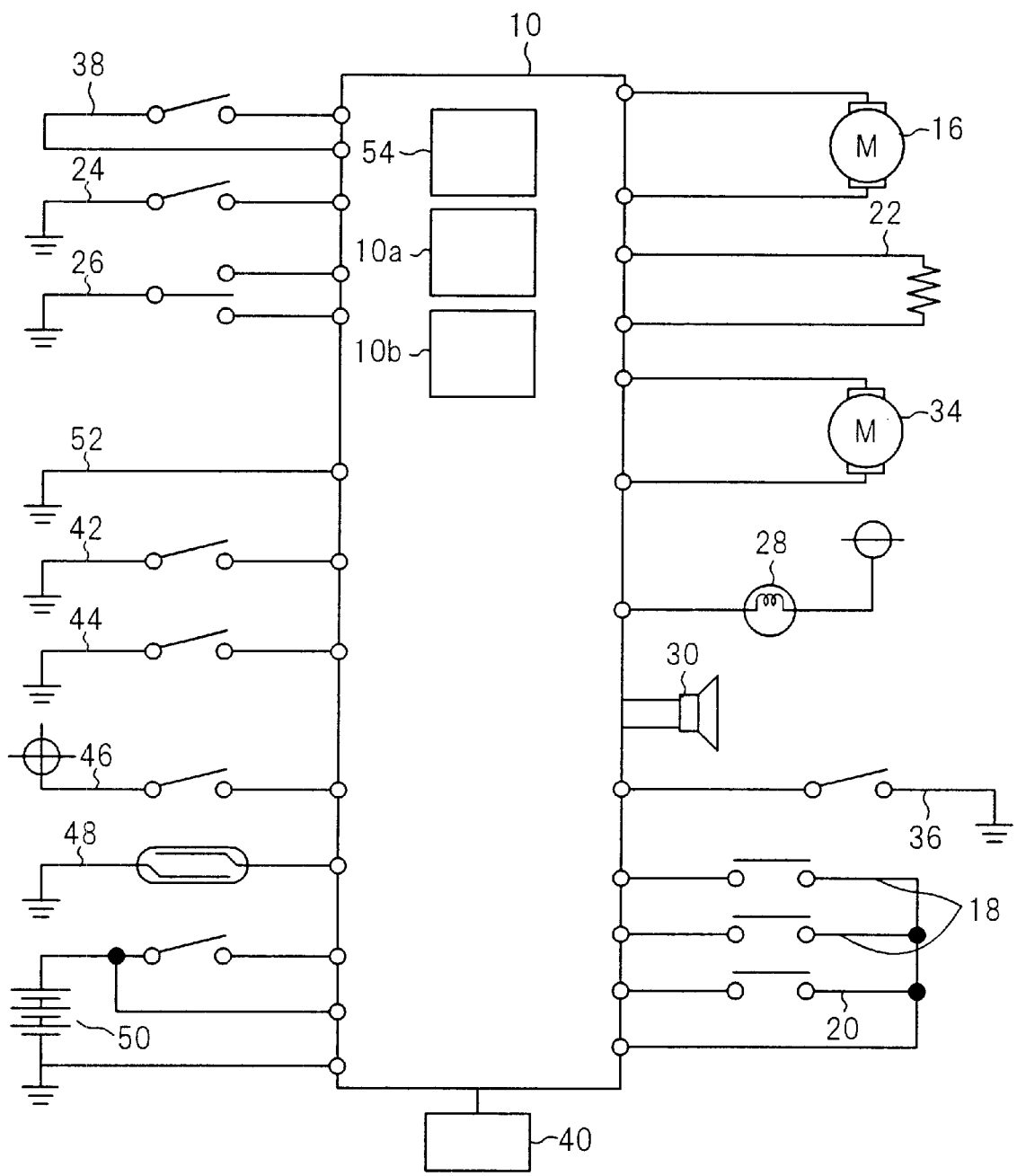
FIG. 2 is a diagram for explaining the relationship between signal inputs and outputs of an ECU that is a constituent of the system for controlling a vehicle power sliding door.

FIG. 1 is an overall configuration diagram showing a vehicle installed with a system 1 for controlling a vehicle power sliding door according to an embodiment of the present invention. The vehicle power sliding door control system 1 includes an electronic control unit (ECU) 10 comprising a microcomputer (not shown) and installed at a suitable location near a power sliding door 14 in a vehicle 12 like that shown in FIG. 1. FIG. 2 is a diagram for explaining the detailed configuration of the system 1 primarily with reference to the ECU 10.

The ECU 10 incorporates a power sliding door motor (hereinafter simply referred to as "motor") 16 for opening and closing the power sliding door 14, an electric encoder 18 for detecting the speed and direction of door movement (opening and closing), a switch 20 installed at a suitable part of a slide portion (not shown) of the power sliding door 14 for detecting reversing-permitted/reversing-prohibited regions and a magnetic clutch 22 disposed between the motor 16 and a drive pulley (not shown) for reducing the speed and increasing the output torque of the motor 16 (only the circuit for supplying power to the magnetic clutch is shown in FIG. 2).

A main switch 24 for permitting opening/closing of the power sliding door 14, i.e., for enabling door driving, and an open/close switch 26 for inputting power sliding door 14 open/close commands are installed at suitable locations near the driver's seat (not shown) inside the passenger compartment of the vehicle. A warning lamp 28 for notifying the driver when some irregularity arises in the power sliding door 14 is provided at a suitable location on an instrument panel (not shown). In addition, a buzzer 30 is provided at a suitable location in the passenger compartment so that passengers and others can be warned that the power sliding door 14 is about to open or close.

A closure unit 32 for detecting incomplete door closure and issuing a pull-in command is provided on the vehicle body near the power sliding door 14. Moreover, at a suitable location on the power sliding door 14, there is provided a release motor 34 for pulling in the door in response to a pull-in command from the closure unit 32 and also for releasing a junction (not shown) when the power sliding door locked at the fully closed position is to be opened.

The power sliding door 14 is equipped with a switch 36 for indicating when the leading end of the power sliding door 14 in the direction of vehicle advance is not completely closed, i.e., when it is open, and a touch switch 38 for detecting power sliding door jamming, i.e., the presence of an object or person in the path of the power sliding door when it is moving in the closing direction.

An inclination sensor 40 for detecting the inclination angle of the vehicle 12 relative to the axis of gravity is provided at a suitable location in the ECU 10. A parking brake switch 42 for detecting the state of a parking brake is provided in the vicinity of a parking (hand) brake lever (not shown) installed at a suitable location near the driver's seat of the vehicle 12.

An AT parking switch 44 is provided near a shift lever (not shown) for detecting whether or not the shift lever is in park (P) position. Near a foot brake pedal (not shown) provided at a suitable location near the driver's seat, there is installed a foot brake switch 46 for detecting whether or not the foot brake is in operation. A vehicle speed sensor 48 for detecting the vehicle speed is provided at a suitable part of the vehicle drive train (not shown).

The detected values of the various sensors and switches are input to a CPU 10a and stored in a memory 10b within the ECU 10, either directly or after appropriate signal processing. In the interest of simplicity of illustration, only some of the sensors etc. are shown in FIG. 1. As best shown in FIG. 2, the vehicle power sliding door control system is supplied with electrical power by an electric power supply 50 (an onboard 12V battery, for instance) and is provided with a ground connection 52 for grounding the various circuits in the control system. The ECU 10 is further equipped with a controller 54 for controlling the driving of the motor 16.

The motor 16 and its drive circuit, which strongly reflect the features of the present invention, will now be explained.

Figure 3:
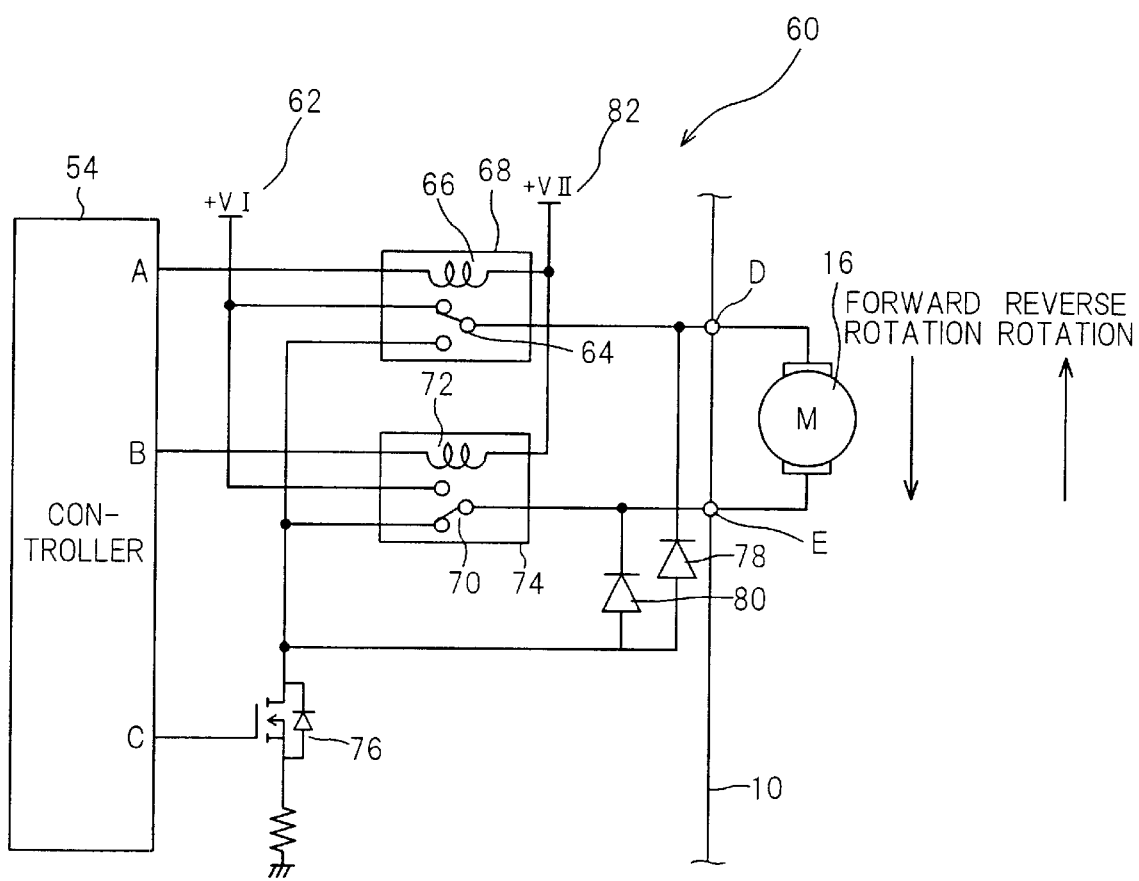
FIG. 3 is a diagram showing the motor and motor drive circuit for opening and closing the power sliding door of the system of FIG. 1.

FIG. 3 is a diagram showing the motor (motor 16) and (motor) drive circuit 60 for opening and closing the power sliding door 14 of the system shown in FIG. 1. As shown, the drive circuit 60 includes a first relay 68 composed of a first switching relay 64 that is connected to an appropriate power supply 62 (of about 12V, for example) when open and a first coil 66 for switching the first switching relay 64, a second relay 74 composed of a second switching relay 70 that is connected to the power supply 62 when open and a second coil 72 for switching the second switching relay 70. The outputs of the first relay 68 and second relay 74 are connected to the motor 16.

When closed, the first and second switching relays 64 and 70 are connected to an FET 76. Lines branching from appropriate points of the lines connecting the first and second switching relays 64 and 70 and the motor 16 pass through a first diode 78 and a second diode 80 and rejoin into a single line that connects with an appropriate point on the line connecting the first and second relays 68 and 74 with the FET 76. In the connection state illustrated in FIG. 3, the first relay 68 is opened (Lo current level) and the second relay 74 is closed (Hi current level). The first diodes 78 and 80 are connected with their anodes on the ground side.

Figure 4:
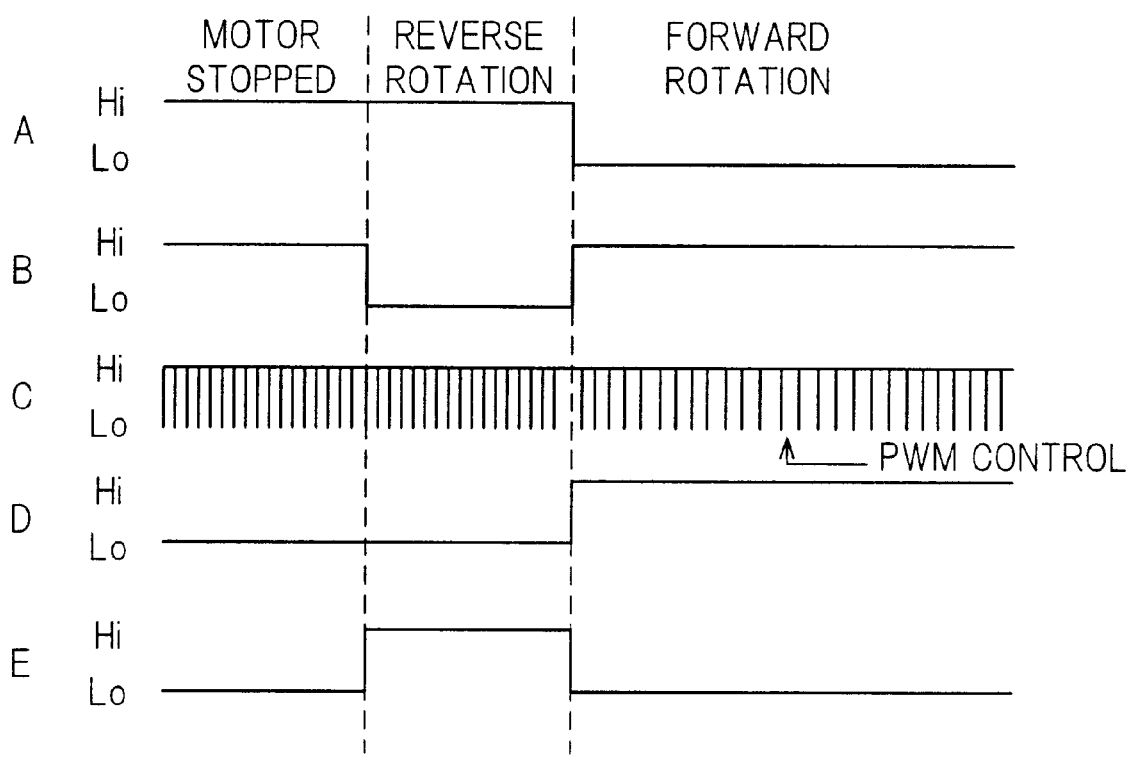
FIG. 4 is a time chart showing the conducting states of controller output ports and detection resistances in the drive circuit shown in FIG. 3.

The first and second coils 66 and 72 are connected so as to be applied with voltage from a suitable electric power supply 82 (an onboard 12V battery, for instance) and are connected to output ports A and B of the controller 54 provided in the ECU 10, from which they are input with ON/OFF commands. The gate of the FET 76 is connected to an output port C from which it is supplied with a pulse signal. By passing Hi and Lo currents through output ports A and B of the drive circuit 60 as shown in FIG. 4 the drive state of the motor 16 can be controlled as indicated by the detection resistances D and E, while PWM control can be effected by sending an appropriate pulse signal through the output port C.

The opening and closing operations of the vehicle power sliding door control system described in the foregoing will now be explained.

Figure 5:
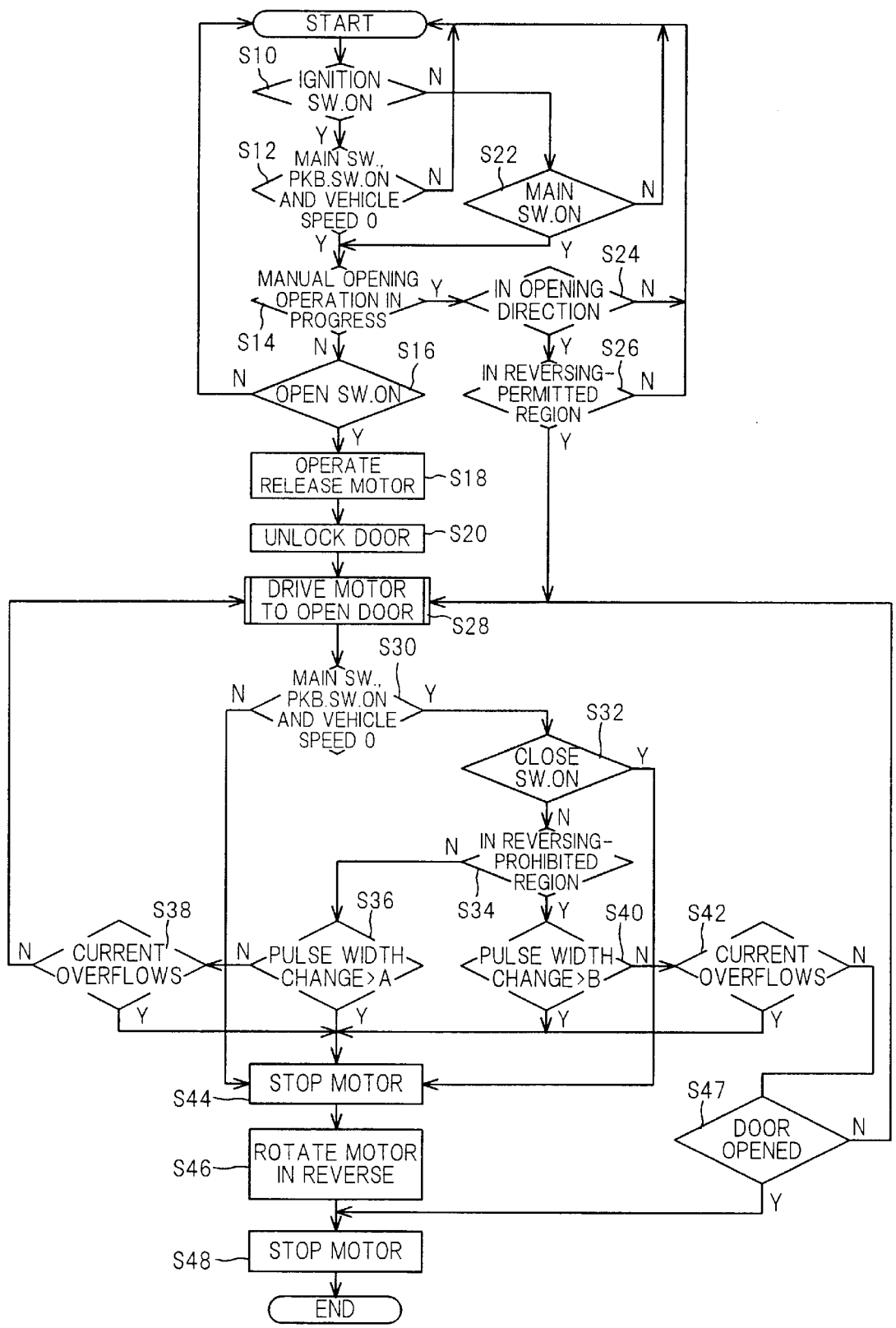
FIG. 5 is a flow chart showing the sequence of power sliding door opening operations conducted by the system for controlling a vehicle power sliding door of FIG. 1.

FIG. 5 is a flow chart showing the sequence of power sliding door 14 opening operations conducted by the system for controlling a vehicle power sliding door of FIG. 1. The program represented by this flow chart is activated once every 10 msec., for example.

First, in S10, it is checked whether the ignition switch (not shown) installed in the vicinity of the driver's seat of the vehicle 12 is ON. When the result is YES, the program goes to S12, in which a check is made to confirm that the main switch 24 and parking brake switch 42 are ON and the vehicle speed detected by the vehicle speed sensor 48 is zero km/h. This check is made because of the danger of opening or closing (particularly opening) the power sliding door when the vehicle 12 is moving.

When the result in S12 is YES, the program goes to S14, in which it is checked whether a manual opening operation is in progress, i.e., whether a passenger or someone else is opening the power sliding door 14 by hand. This check is made by reading the output of the encoder 18. When the result in S14 is NO, the program goes to S16, in which it is checked whether a power sliding door open command has been input by the open/close switch 26, i.e., whether the open/close switch 26 is in the DOOR-OPEN position.

When the result in S16 is YES, the program goes to S18, in which the release motor 34 is operated, and then to S20, in which the junction is released to unlock the power sliding door 14. When the result in S10 is NO, the program goes to S22, in which it is checked whether the main switch 24 is ON and, when it is, to S14. This is to enable opening of the power sliding door 14 even when the ignition switch is not ON.

When it is found in S14 that a manual opening operation is in progress, the program goes to S24, in which the direction of power sliding door 14 operation is confirmed by reading the pulse pattern generated from the encoder 18. More precisely it is confirmed whether the direction of door 14 is in opening direction.

When the result in S24 is YES, the program then goes to S26, in which it is discriminated whether the door position detected from the output of the switch is in a reversing-permiitted region (explained below). When the result in any of S12, S22, S24 and S26 is NO, the program returns to START.

The "reversing" and "reversing-permitted region" (and "reversing-prohibited region" ) will now be explained. "Reversing" refers to changing the direction of movement of the power sliding door 14 during opening or closing, i.e., changing the direction in which the power sliding door 14 is being driven to opposite direction thereto. The range over which the power sliding door 14 can move is divided into a region in which immediate reversing is permitted and regions in which immediate reversing is prohibited, Specifically, within the overall range of power sliding door 14 movement, a region of a few millimeters just before the fully closed position and a region of a few millimeters just before the fully open position are defined as "reversing-prohibited regions." The reversing-prohibited regions are defined as regions at the full-open and full-closed positions of the sliding door for distinguishing their detection from detection of sliding door operation halt and jamming.

Figure 6:
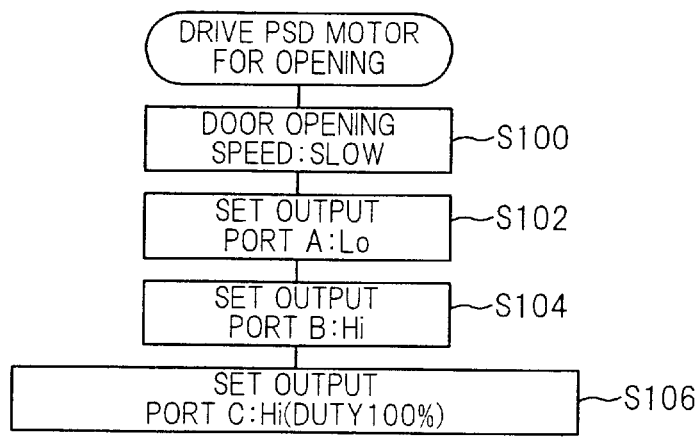
FIG. 6 is a subroutine flow chart of the operations conducted in S28 of the flow chart of FIG. 5 when the duty ratio is 100% during power sliding door opening.
Figure 7:
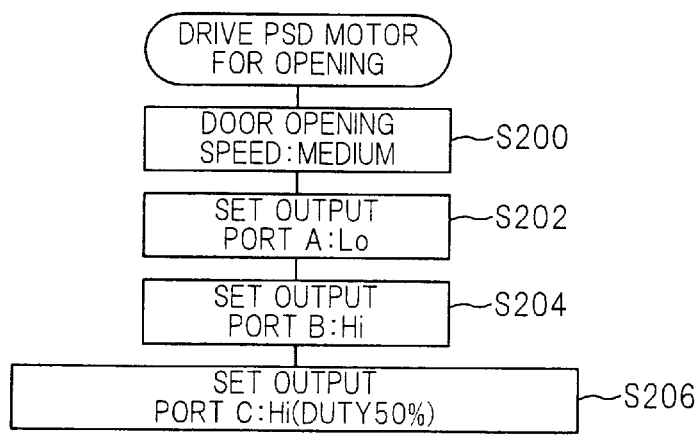
FIG. 7 is a subroutine flow chart showing the operations conducted in S28 of the flow chart of FIG. 5 when the duty ratio is 50% during power sliding door opening.
Figure 8:
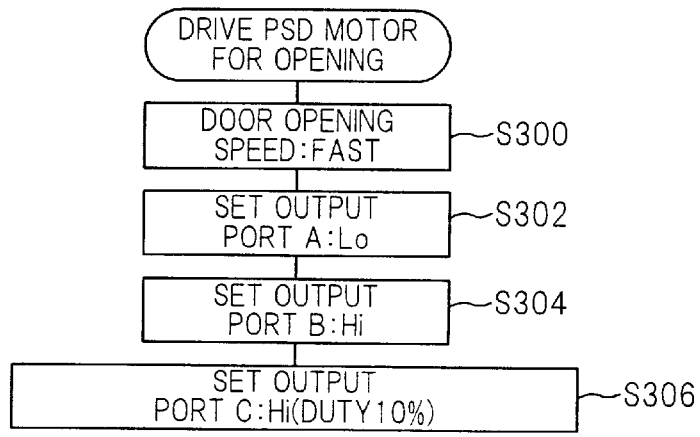
FIG. 8 is a subroutine flow chart showing the operations conducted in S28 of the flow chart of FIG. 5 when the duty ratio is 10% during power sliding door opening.

The explanation of the flow chart of FIG. 5 will be continued. After the lock is released in S20, the program goes to S28, in which the power sliding door 14 is driven in the opening direction. FIGS. 6 to 8 are subroutine flow charts of the operations conducted in S28.

The subroutine of FIG. 6 is for determining the Hi and Lo currents passing through the output ports A and B and the duty ratio of the pulse signal output from the output port C when the speed of the power sliding door 14 driven in the opening direction is slower than the rated opening/closing speed (opening speed: slow). A "slow opening speed" arises, for example, when the vehicle 1 is parked on a downward slope and the opening speed of the power sliding door 14 is slowed by the sliding door's own weight.

The subroutine of FIG. 6 starts with S100, in which information is read that indicates the power sliding door 14 is in the course of an opening operation and the opening speed of the power sliding door 14 is slow. When the power sliding door 14 is in the full-closed state, the information that the opening speed is (will be) slow is obtained by analyzing the output of the inclination sensor 40. When the power sliding door 14 is in the course of an opening operation, it is obtained by analyzing the output of the encoder 18.

The program then goes to S102 and S104, in which, as shown in FIG. 4, the Lo and Hi signals are passed through output ports A and B, and then to S106, in which the duty ratio of the pulse signal output from the output port C is set to 100%. In the subroutines of FIGS. 7 and 8, the duty ratio of the pulse signal output from the output port C is similarly set to a value that is inversely or substantially inversely proportional to the detected opening speed of the power sliding door 14, specifically, to 50% when the door opening speed is medium and to 10% when it is fast.

The explanation of flow chart of FIG. 5 will be resumed. Next, in S30, another check is made to confirm that the main switch 24 and parking brake switch 42 are ON and the vehicle speed detected by the vehicle speed sensor 48 is zero km/h. When the result in S30 is YES, the program goes to S32, in which it is checked whether the open/close switch 26 is in the DOOR-CLOSE position.

When the result in S32 is NO, the program goes to S34, in which it is checked whether the power sliding door 14 is in a reversing-prohibited region. When the result in S34 is NO, i.e., when the door is in the reversing-permitted region, the program goes to S36, in which it is checked whether the amount of change in pulse width at the encoder 18 exceeds a prescribed value A. This check is made because the fact that the rotational speed of the motor 16 has reached or exceeded a prescribed value many mean that a person or object has been caught in the sliding door so that driving of the motor 16 must be halted. The prescribed value A is the upper limit of pulse width change amount in the reversing-permitted region.

When the result in S36 is NO, the program goes to S38, in which it is checked whether an overcurrent is flowing through the drive circuit 60. Like S36, S38 is also for fail detection and is carried out by a fail detection circuit (not shown) provided at a suitable place in the drive circuit 60. When the result in S38 is NO, the program returns to S28 and the power sliding door operation is continued.

When the result in S34 is YES, the program goes to S40, in which it is checked whether the amount of change in pulse width at the encoder 18 exceeds a prescribed value B. When the result in S40 is NO, the program goes to S42, in which a check like that in S38 is made to determine whether an overcurrent is present. When the result in S42 is NO, the program returns to S28 and the power sliding door operation is continued. The prescribed value B is the upper limit of pulse width change amount in the reversing-prohibited regions.

When the result in S30 is NO or the result in one of S32, S36, S40 and S42 is YES, the operation of the power sliding door 14 must be halted. In these cases, therefore, the program goes to S44, in which the operation of the motor 16 is immediately stopped, and to S46, in which the motor 16 is rotated in the reverse direction. When the result in S42 is NO, the program goes to S47 in which it is determined whether the power sliding door 14 is completely opened. If not the program goes back to S28, while if so, the program goes to S48, in which the motor 16 is stopped and the program terminated.

Figure 9:
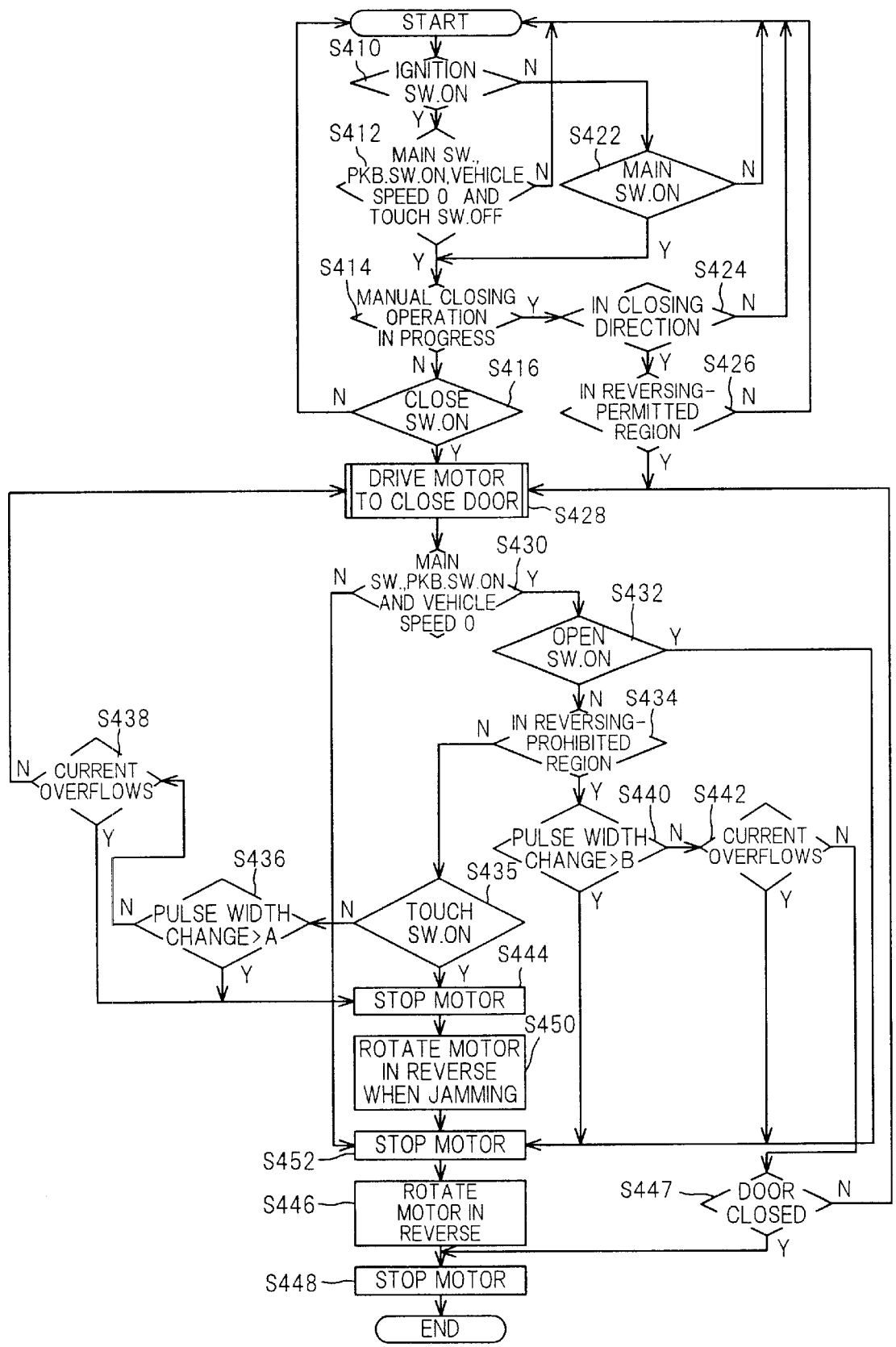
FIG. 9 is a flow chart showing the sequence of power sliding door closing operations conducted by the system for controlling a vehicle power sliding door of FIG. 1.

The sequence of the power sliding door 14 closing operations will now be explained with reference to the flow chart of FIG. 9.

The program represented by this flow chart is activated once every 10 msec, for example. Aspects of the power sliding door 14 closing operation that are the same as those of the opening operation will not be explained again. The steps in FIG. 9 that are the same as those in FIG. 5 are assigned reference numerals whose last two digits are the same as those of the corresponding step in FIG. 5. It should be noted here that the motor 16 is rotated in reverse when jamming has occurred S450 and is stopped in S452.

An explanation will now be made centering on points in which the flow chart of FIG. 9 differs from that of FIG. 5. At the beginning of the closing operation, a check is made in S412 regarding the same points as in the corresponding S12 of FIG. 5 plus the additional point of the touch switch 38 being OFF. This is because the fact that the touch switch 38 is ON may mean that the power sliding door 14 is in the full-closed position or that jamming has occurred owing to the presence of an obstacle or the like at the end of the power sliding door in the direction of vehicle advance. Similarly, the ON/OFF state of the touch switch 38 is checked in S435.

The steps of operating the release motor and releasing the lock (S18 and S20) of the opening operation are omitted from the closing operation. On the other hand, S450 and S452 for carrying out reversing and halting operations when jamming occurs are added in order to prevent catching of, for example, a passenger's hand in the door.

Figure 10:
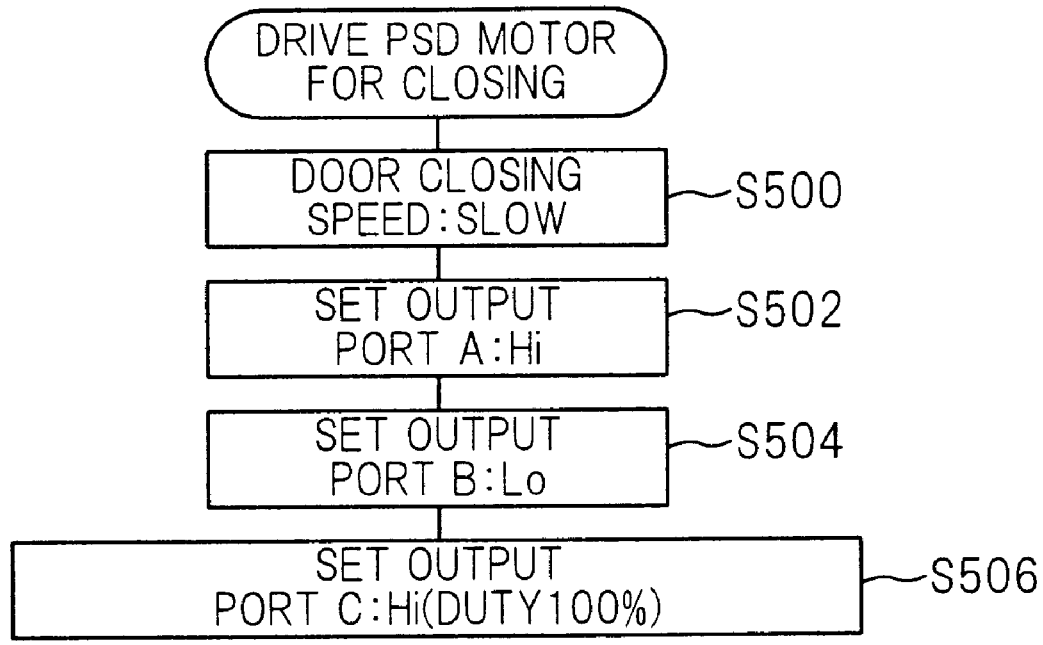
FIG. 10 is a subroutine flow chart of the operations conducted in S428 of the flow chart of FIG. 9 when the duty ratio is 100% during power sliding door closing.
Figure 11:
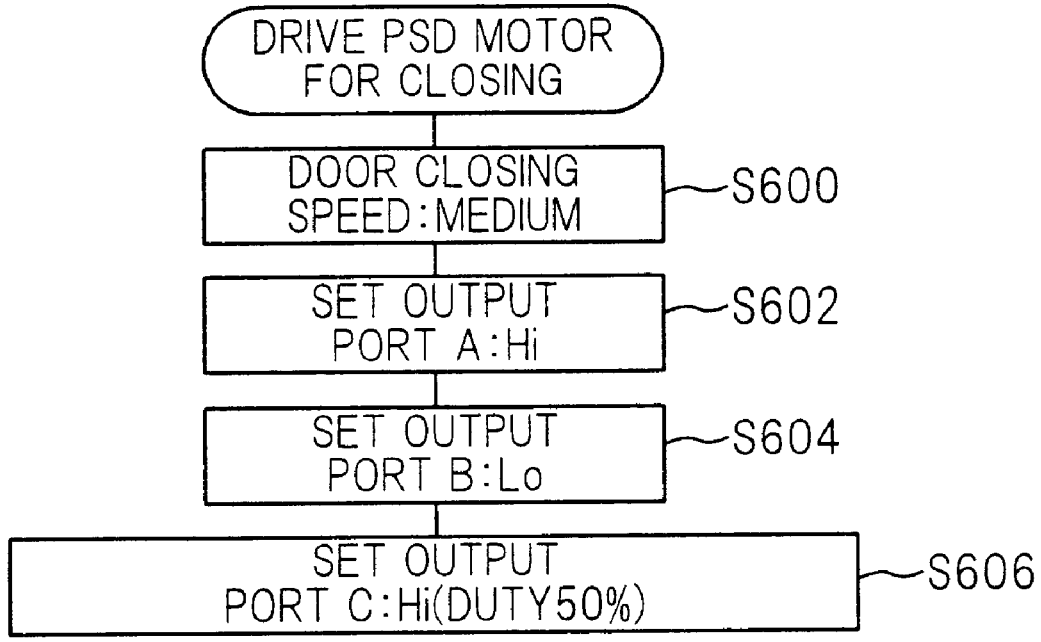
FIG. 11 is a subroutine flow chart showing the operations conducted in S428 of the flow chart of FIG. 9 when the duty ratio is 50% during power sliding door closing.
Figure 12:
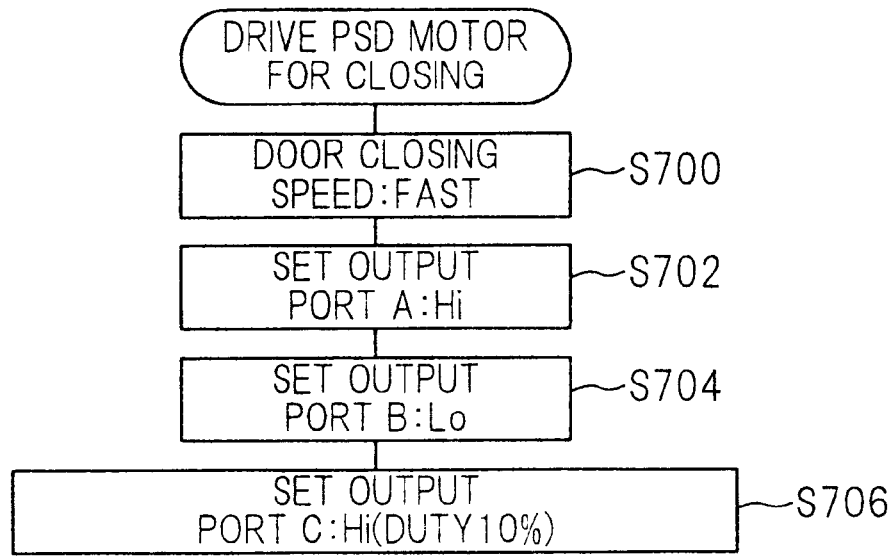
FIG. 12 is a subroutine flow chart showing the operations conducted in S428 of the flow chart of FIG. 9 when the duty ratio is 10% during power sliding door closing.

Subroutine flow charts of the operations conducted in S428 are shown in FIGS. 10, 11 and 12. As indicated by S500 to S506 of FIG. 10, S600 to S606 of FIG. 11 and S700 to 706 of FIG. 12, the duty ratio of the pulse signal output from the output port C is determined so as to maintain the closing speed of the power sliding door 14 constant.

Figure 13:
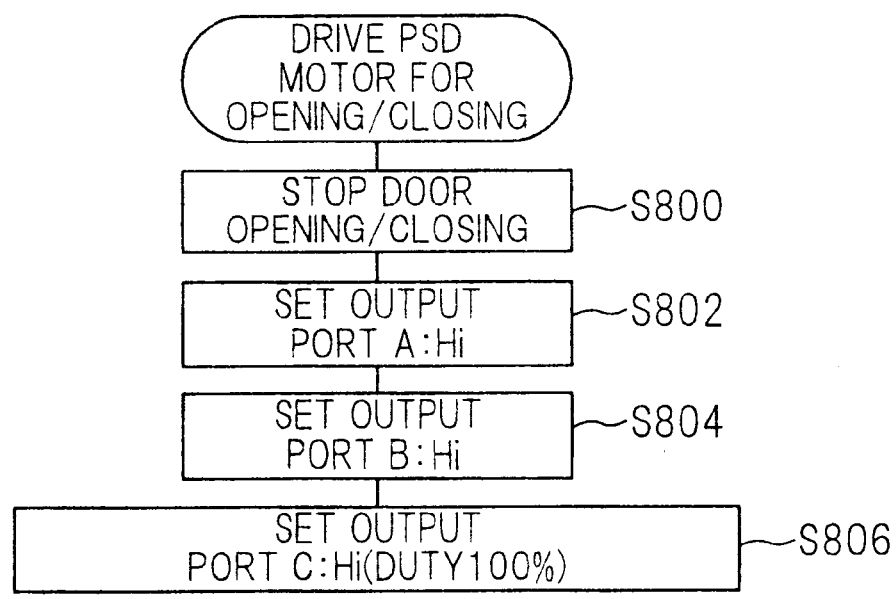
FIG. 13 is a subroutine flow chart showing the operations conducted in S28 (FIG. 5) and S428 (FIG. 9) when opening/closing of the power sliding door is stopped.

When the power sliding door 14 is not in the course of an opening or closing operation, i.e., when it is stationary, the motor 16 is stopped by setting the outputs of the output ports A, B and C of the drive circuit 60 to Hi, Hi and Hi as shown in FIGS. 4 and 13.

The first and second diodes 78 and 80 installed in the drive circuit 60 will now be explained.

Figure 14:
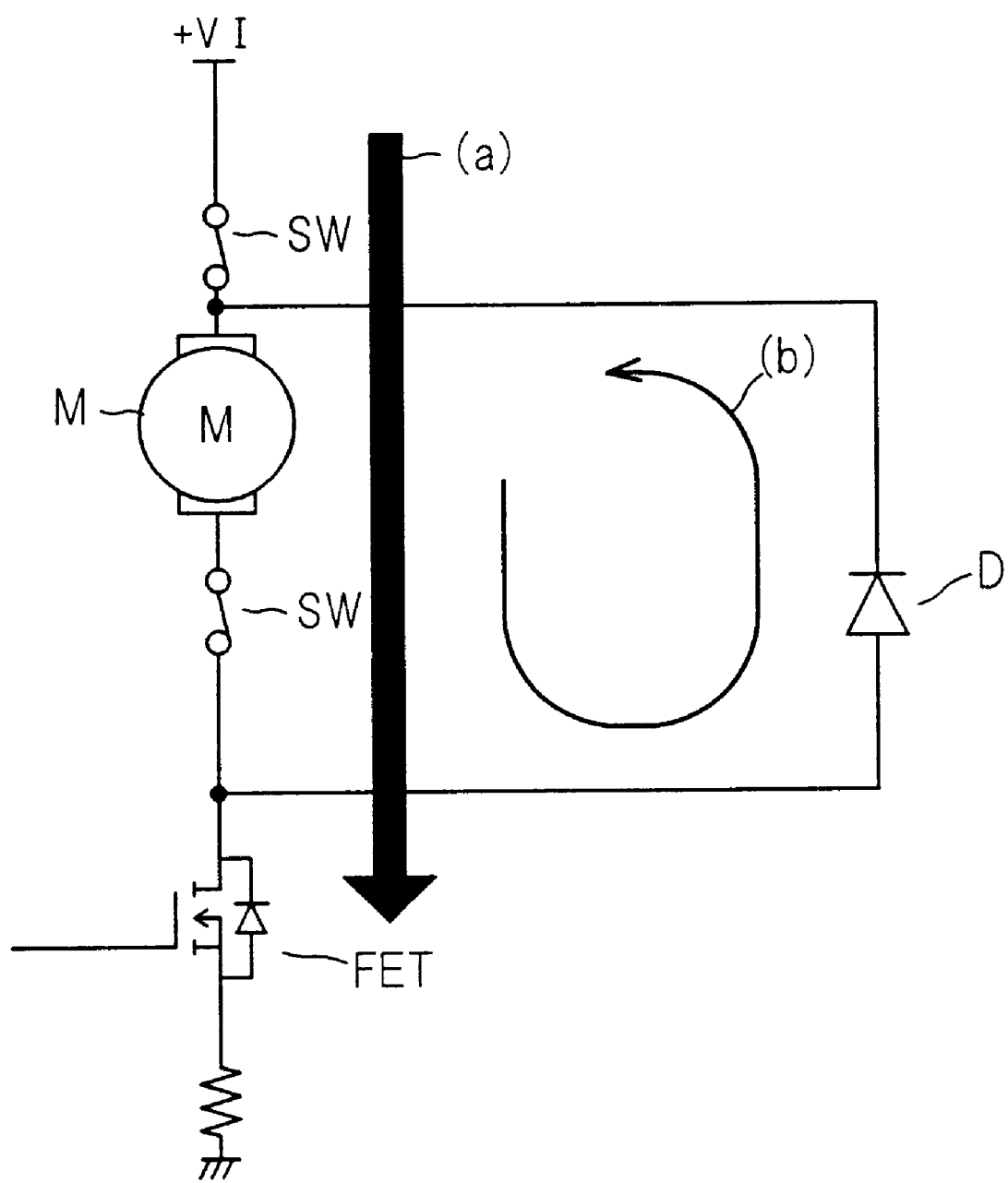
FIG. 14 is a diagram for explaining the operation of commutation (flywheel) diodes provided in the circuit of FIG. 3.

FIG. 14 is a simplified explanatory diagram of the configuration in the vicinity of the motor 16 of the drive circuit 60 in the present embodiment. When switch SW is turned ON with the FET in the ON state, current flows in the direction of the arrow (a). When the FET is thereafter turned OFF, energy stored in the reactance component of the motor M produces current in the direction of the arrow (b).

Without the illustrated diode D (commutation diode or flywheel diode), the release of the energy stored in the reactance component of the motor M produces a positive voltage (counter electromotive force) on the FET side. If the reverse electromotive energy is great, the rated voltage of the FET is liable to be exceeded and, in the worst case, the FET may be damaged. In this embodiment, the counter electromagnetic energy released by the reactance component of the motor 16 is prevented from damaging the FET by the first and second diodes 78 and 80, which act as commutation (flywheel) diodes.

Figure 15A:
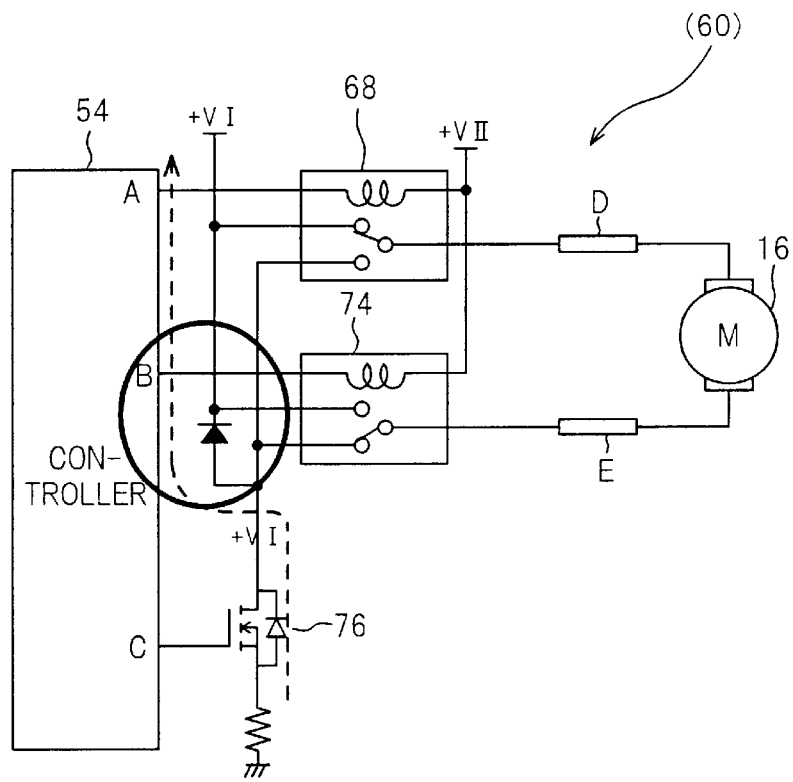
FIGS. 15A and 15B are diagrams for explaining circuit locations of commutation (flywheel) diodes in a motor drive circuit of the invention.
Figure 15B:
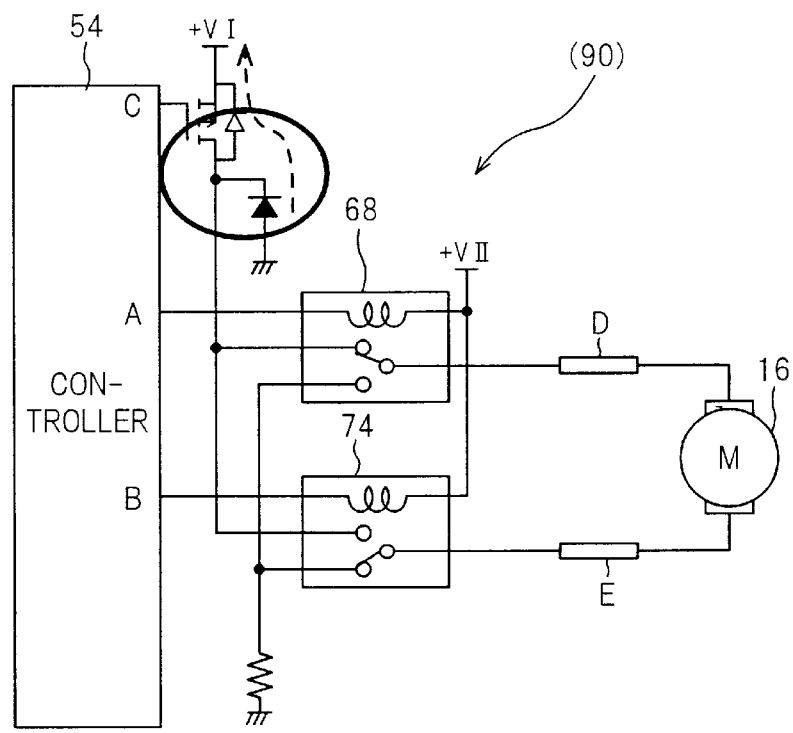

Diodes incorporated in the circuit as indicated by the encircled portions in FIGS. 15A and 15B can also function as commutation diodes. However, if the battery should be connected backward, current flowing as indicated by the arrows may result in damage to the FET 76 by overcurrent. In contrast, when branch points are formed between the motor 16 and the switches and grounding is established from the branch points through diodes as in the system in the present embodiment, the controller 54 cannot operate when the battery is connected backward and, therefore, the relays 68 and 74 do not turn ON. As the system in the embodiment calls for use of two diodes, moreover, the loss arising during commutation is divided between them so that use of relatively small diodes suffices. The circuit (90) shown in FIG. 15B relates to the second embodiment set out later.

The total heat losses of the conventional motor drive circuit configured as an H bridge circuit using FETs and the system of the present invention were compared. The comparison was made under conditions of: FET ON, 10 A current, and motor not driven.

The results of the loss comparison are shown in FIG. 16. The total heat loss of the conventional configuration was 17.5 W and that of the configuration in the invention was 6.4 W, thus demonstrating the lower total heat loss of the invention system in comparison with the conventional FET/H bridge configuration.

Figure 17:
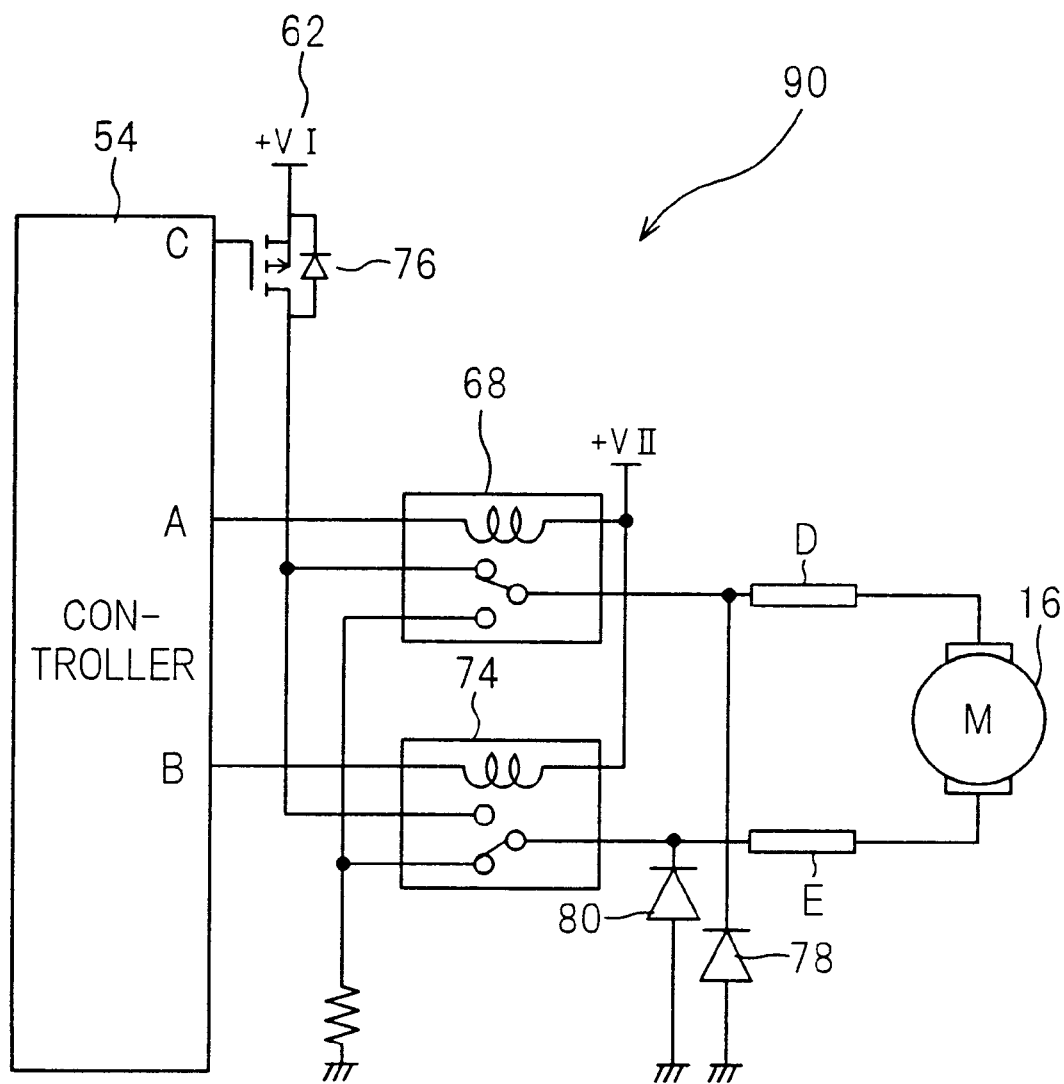
FIG. 17 is a diagram, similar to that of FIG. 3, showing a motor drive circuit in a system for controlling a vehicle power sliding door according to a second embodiment of the present invention.

FIG. 17 is a diagram, similar to that of FIG. 3, showing a motor drive circuit 90 in the system according to a second embodiment of the present invention. All constituent elements of the motor drive circuit 90 are the same as those shown in FIG. 3 and are therefore assigned the same reference symbols.

In the circuit according to the second embodiment, the FET 76 is disposed between the power supply 62 and the first and second relays 68 and 74. The effects obtained with this circuit arrangement are exactly the same as those provided by the (motor) drive circuit 60. The discussion made with reference to the first embodiment should therefore be applied to the second embodiment.

Figure 18:
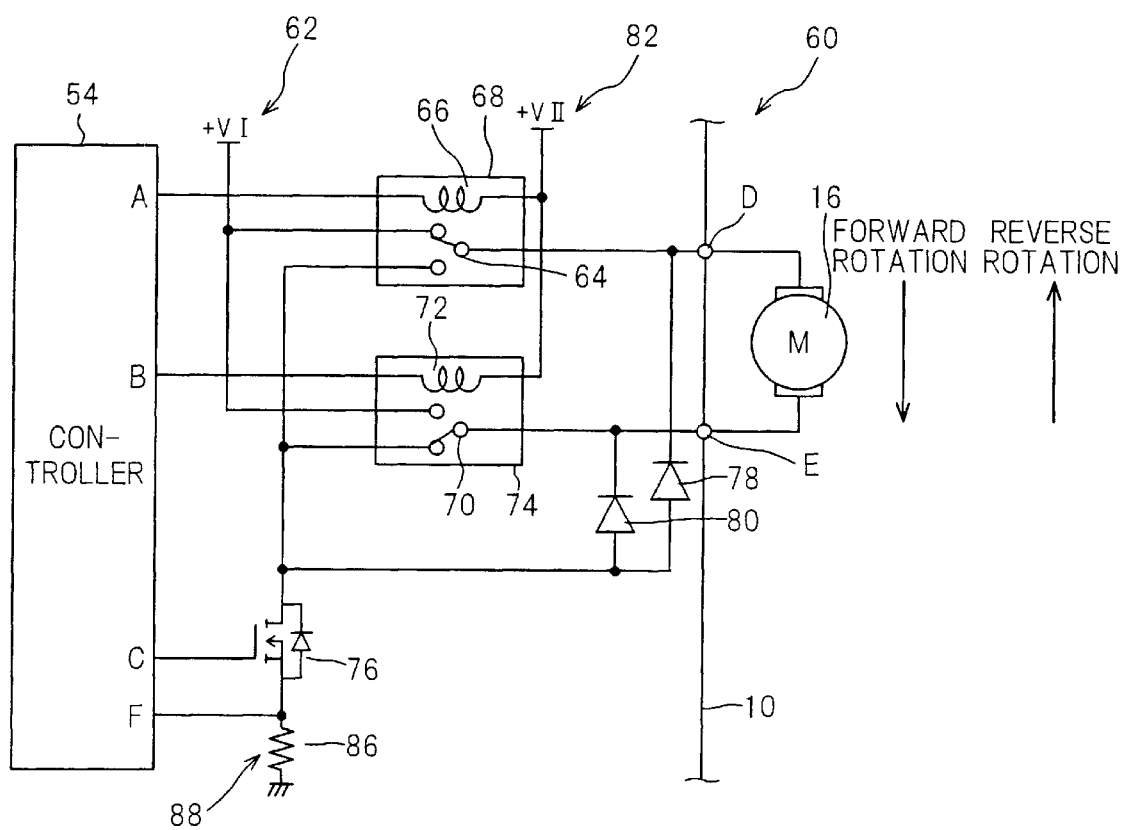
FIG. 18 is a diagram, similar to that of FIG. 3, showing a motor drive circuit in a system for detecting faulty operation of a vehicle power sliding door according to a third embodiment of the present invention.

FIG. 18 is a diagram, similar to that of FIG. 3, showing a motor drive circuit 90 in a system for detecting faulty operation of a vehicle power slide door according to a third embodiment of the present invention.

Explaining this with focus on the difference from that of FIG. 3, a detection resistor 86 is added at a position downstream of the FET 76 and the ground. A sensor (current detecting means) 86 is provided at a position between the FET 76 and the resistor 86 for detecting current flowing the path. The sensor 86 is connected to a current detection port F of the controller 54 provided in the ECU 10 to forward the output indicative voltage at a position upstream of the resistor 86.

The output of the sensor 86 is amplified by an operational amplifier (not shown) and is A/D:) converted by an A/D converter such that the controller 54 is able to detect current flow by the voltage drop between the detection resistor 86. Since this type of a sensor is well-known, no further explanation will be made.

The faulty operation detection in the aforesaid vehicle power sliding door control system will now be explained.

Figure 19:
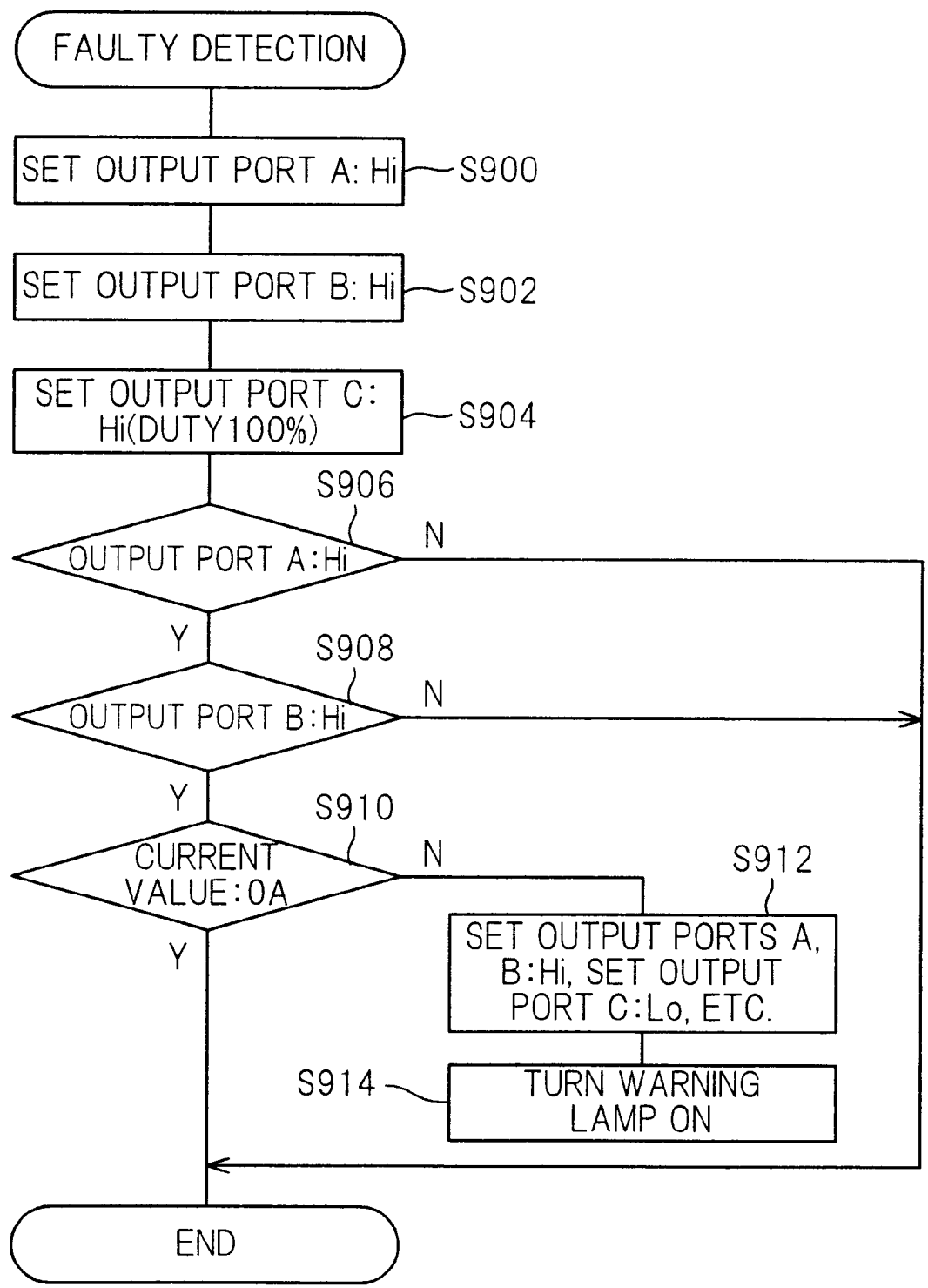
FIG. 19 is a flow chart showing the sequence of operations carried out by the system for detecting faulty operation of a vehicle power sliding door according to the third embodiment.
Figure 20:
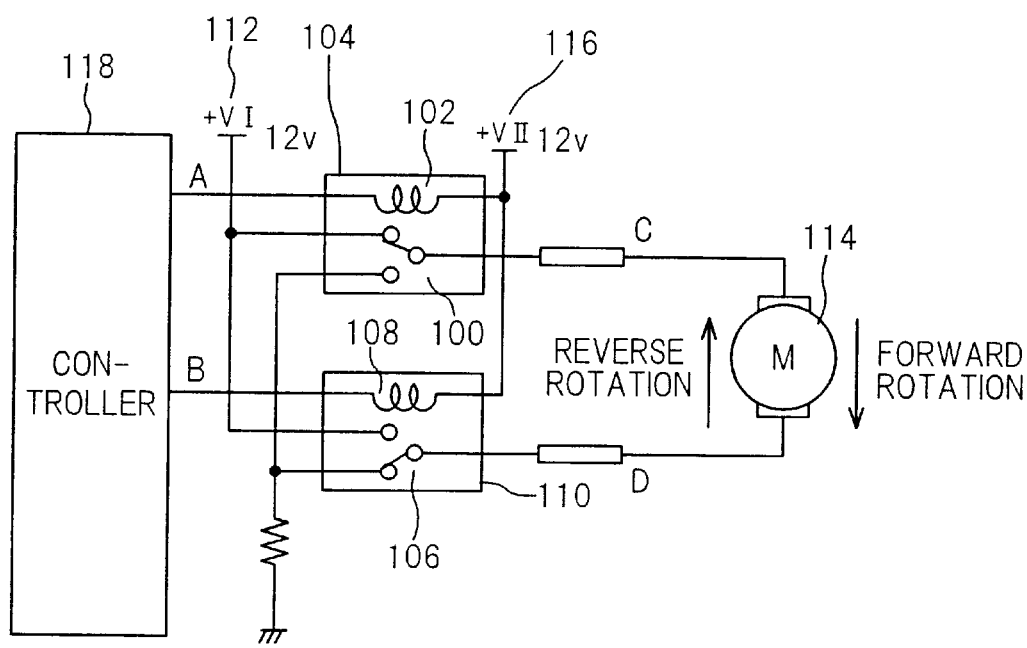
FIG. 20 is a diagram for explaining the basic configuration of a motor drive circuit for controlling the direction of rotation of a power sliding door motor in a conventional system for controlling a vehicle power sliding door.
Figure 21:
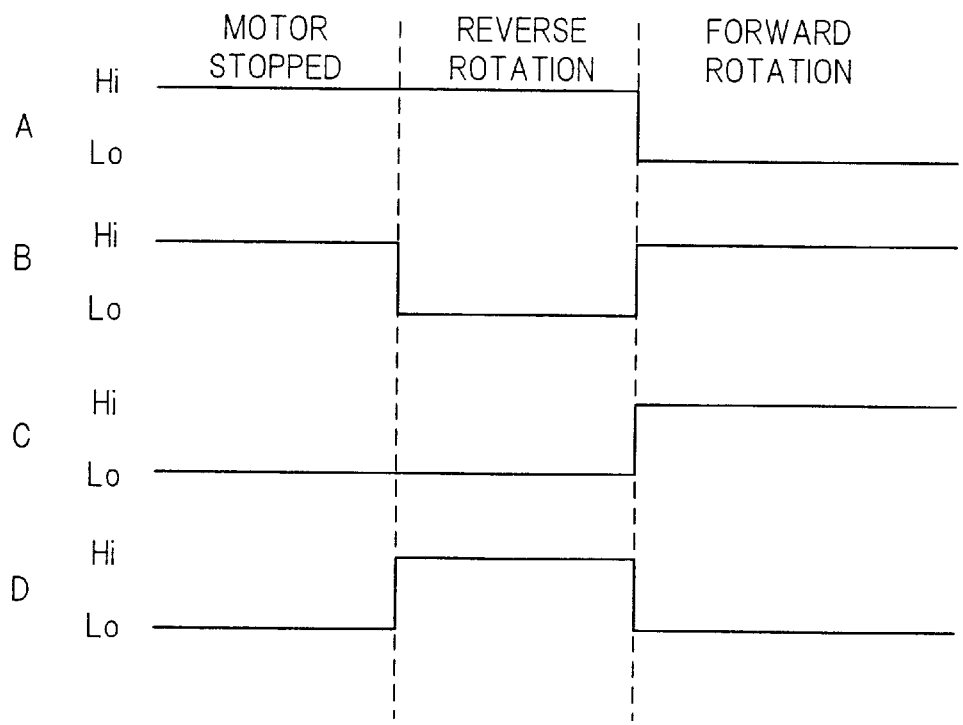
FIG. 21 is a time chart showing conducting states of the motor drive circuit shown in FIG. 20.
Figure 22:
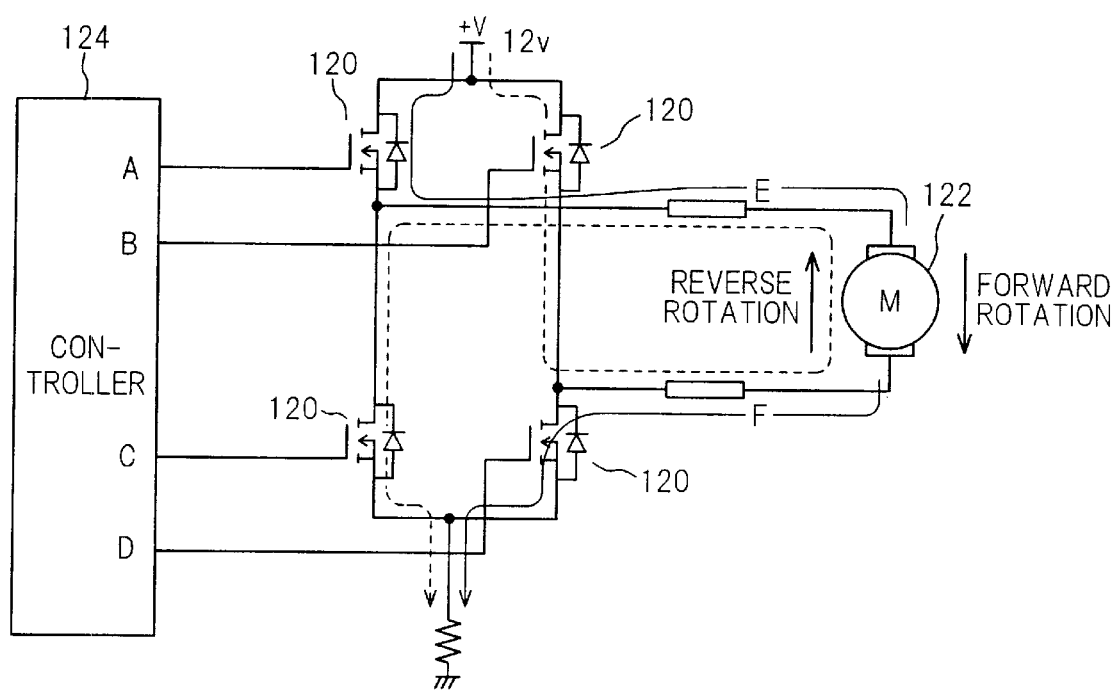
FIG. 22 is a diagram for explaining the basic configuration of a conventional motor drive circuit that uses an H bridge incorporating FETs to control the direction of rotation and rotational speed of a power sliding door motor.
Figure 23:
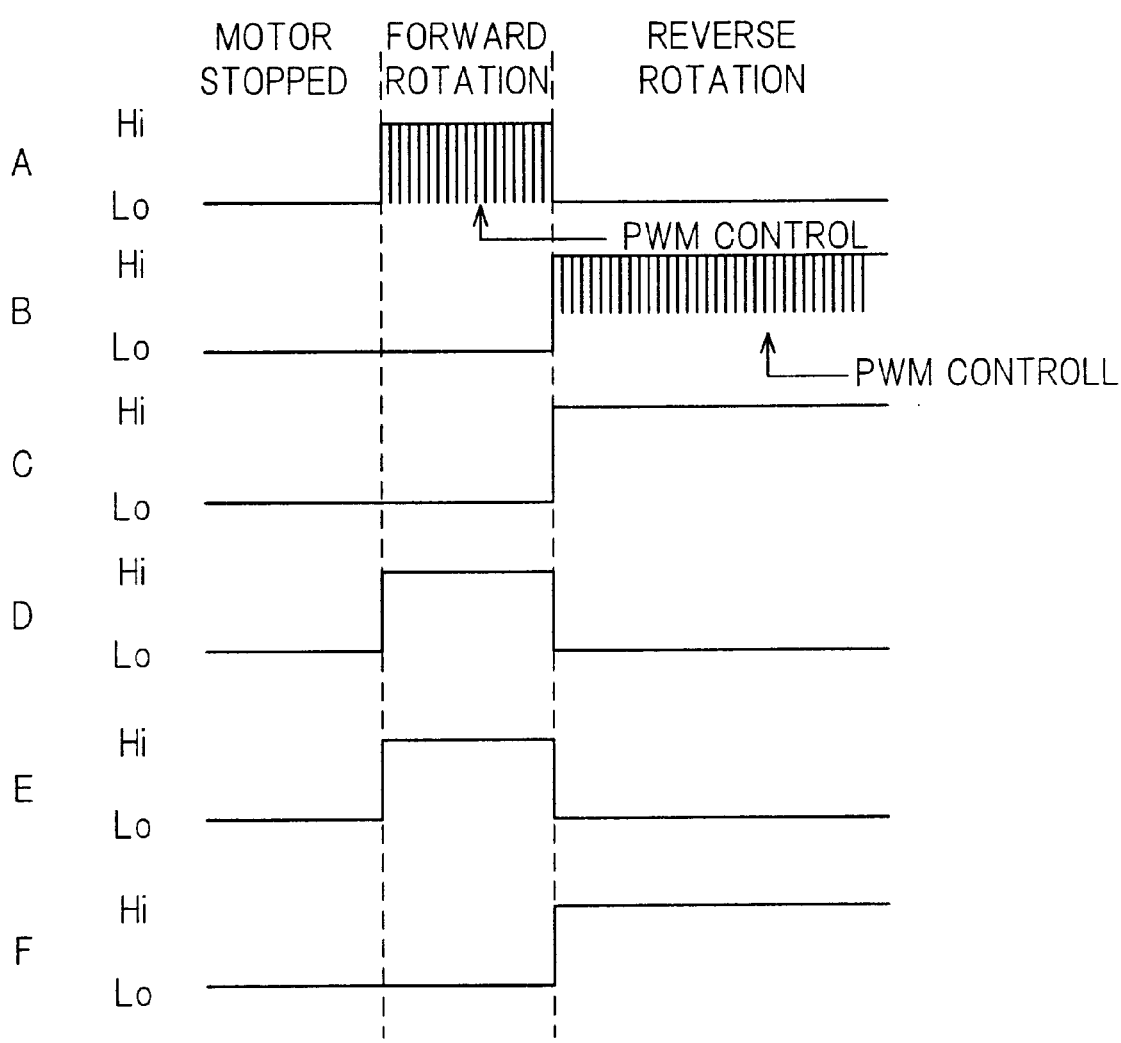
FIG. 23 is a time chart showing conducting states of the motor drive circuit shown in FIG. 22.

FIG. 19 is a flow chart showing the sequence of operations carried out by the system for detecting faulty operation of the vehicle power sliding door according to this embodiment. The program represented by this flow chart is activated once every suitable period of, for example, 10 msec. or shorter, while the motor 16 is stopped.

First, in S900 and S902, the system is set to pass Hi current from the output ports A and B through the first and second relays 68 and 74. The program then goes to S904, in which the output from the output port C is set to Hi, i.e., the duty ratio of the pulse signal output from the output port C is set at 100%.

Next, in S906, a check is made as to whether the output from the output port A is Hi. When the result is NO, the faulty operation detection is terminated. When it is NO, the program goes to S908, in which a check is made as to whether the output from the output port B is Hi.

When the result in S908 is NO, the faulty operation detection is terminated. When the result is YES, the program goes to S910, in which the current value detected by the sensor 88 at the current detection port F is read. As explained earlier, when the outputs of the output port A and B are Hi, it follows that the first and second relays 68 and 74 have burned out. When the result in S910 is NO, therefore, it is likely that a faulty operation has occurred. For example, a short (short-circuiting) has occurred between the first or second relay and ground or that the first and second relays have shorted with each other.

The program therefore goes to S912, in which the outputs of output ports A and B are set to Hi and the output of output port C is set to Lo, i.e., the duty ratio is set to 0%, and a command is issued to cut off current flow. Next, in S914, the warning lamp 28 is turned on to warn the passengers that the circuit has failed.

Being configured in the foregoing manner, the system of this embodiment can, without operating the motor, achieve detection and cut-off abnormal current flow in the circuit with a simple configuration. In addition, it can efficiently detect and isolate shorts arising between the relay lines, between relay lines and ground, and so on.

In the third embodiment, although the sensor 88 is -located between the FET 76 and the resistor 86. The point at which the sensor 88 is incoporated is not limited to this location, however, but can be installed at any pointwhere current flows when the first and second relays short.

Moreover, although the sensor 88 detects current state (presence/absence of current), it can instead be configured to similarly detect whether or not voltage is applied at a prescribe point.

Thus, the first and the second embodiments are configured to have a system 1 for controlling a power sliding door 14 of a vehicle, comprising: a motor 16 supplied voltage from a power source mounted on the vehicle for opening or closing the power sliding door; a motor drive circuit 60 for driving the motor having at least a switch (first relay 68, a second relay 74) for switching direction of rotation of the motor and a switching element (FET 76) for regulating the voltage to be supplied to the motor to change a speed of the motor rotation; and a motor-drive-circuit controller (ECU 10, controller 54) for outputting a command value to the motor drive circuit.

The system further includes: means (electric encoder 18, inclination sensor 40) for detecting an opening/closing speed of the power slide door; and wherein the motor-drive-circuit controller regulates the voltage to change the speed of the motor rotation such that the power sliding door is opened or closed at a speed inversely or substantially inversely proportional to the detected speed of the power sliding door, as illustrated in FIGS. 6 to 8 and FIGS. 10 to 12.

The system further includes a branch which is connected to the ground through a diode (first diode 78, second diode 80) such that the diode is connected with its anode on the ground side.

Being configured in the foregoing manner, the systems according to the first and second embodiments can, at the time of driving the motor 16 to open and close the power sliding door 14, implement PWM control and enable the motor 16 to be switched between forward and reverse rotation and varied in rotational speed while holding down the total heat loss of the semiconductor devices. Since the motor 16 is PMW-controlled at a duty ratio approximately inversely proportional to the opening/closing speed of the power sliding door 14, moreover, the door can be opened and closed at a steady speed even when, for example, opening/closing is conducted with the vehicle stopped on an incline. In addition, the FET is protected from damage by application of counter electromotive force or the like.

The third embodiment is thus configured to have system for detecting faulty operation of a power sliding door 14 of a vehicle, comprising: a motor 16 supplied voltage from a power source mounted on the vehicle for opening or closing the power sliding door; a power-sliding door controller provided in a motor current supply circuit for supplying current to the motor having at least a switch (first relay 68, second relay 74) for switching direction of rotation of the motor and a switching element (FET 78) for regulating the voltage to be supplied to the motor to change a speed of the motor rotation; current detecting means (88) for detecting supply of current to the motor; and faulty operation detecting means (controller 54, S20, S24) for detecting that faulty operation has occurred in the power-sliding door controller.

In the system, the faulty operation detecting means detects that the faulty operation has occurred in the power-sliding door controller if the current detecting means detects the supply of current to the motor (S20, S24) when predetermined outputs are supplied to the switch and the switch element (S10, S12, S14).

Although the invention was described with reference to embodiments in which the duty ratio of the pulse signal sent to the gate of the FET is set at 10%, 50% and 100%, these values were merely used as examples and other values can be used instead.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a power sliding door of a vehicle, comprising:
    a motor that is supplied voltage from a power source mounted on the vehicle and operates for opening or closing the power sliding door;
    a motor drive circuit for driving the motor having at least a switch for switching direction of rotation of the motor and a switching element for regulating the voltage to be supplied to the motor to change a speed of the motor rotation;
    a speed detecting means for detecting an opening/closing speed of the power sliding door; and
    a motor drive circuit controller for outputting a command value to the motor drive circuit,
    wherein the motor drive circuit controller regulates the voltage to change the speed of the motor rotation such that the power sliding door is opened or closed at a speed inversely proportional to the detected speed of the power sliding door.

2. A system according to claim 1, further including a branch circuit which is connected to the ground through a diode such that the diode is connected with its anode on the ground side.

3. A system according to claim 1, further including:

a current detecting means connected to the motor for detecting a supply of current to the motor; and a faulty operation detecting means connected to the motor drive circuit controller for detecting whether a faulty operation has occurred in the motor drive circuit controller.

4. A system according to claim 3, wherein the faulty operation detecting means detects that the faulty operation has occurred in the motor drive circuit controller if the current detecting means detects the supply of current to the motor when predetermined switching signal outputs are supplied to the switch and the switch element.

5. A system for detecting a faulty operation of a power sliding door of a vehicle, comprising:

a motor that is supplied voltage from a power source mounted on the vehicle and operates for opening or closing the power sliding door;

a power sliding door controller provided in a motor current supply circuit for supplying current to the motor having at least a switch for switching direction of rotation of the motor and a switching element for regulating the voltage to be supplied to the motor to change a speed of the motor rotation;

a current detecting means connected to the motor for detecting supply of current to the motor; and faulty operation detecting means connected to the power-sliding door controller for detecting that a faulty operation has occurred in the power-sliding door controller if the current detecting means detects the supply of current to the motor when predetermined switching signal outputs are supplied to the switch to stop the motor and the switch element to rotate the motor at a speed.

6. A system according to claim 5, wherein the faulty operation detecting means discontinues supplying of another predetermined switching signal to the switch element to stop the motor when it has been detected that the faulty operation has occurred.

7. A system for controlling a power sliding door of a vehicle, comprising:

a motor that is supplied voltage from a power source mounted on the vehicle and operates for opening or closing the power sliding door;

a motor drive circuit for driving the motor having a first switch for rotating the motor in a first direction, a second switch for rotating the motor in a second direction which is opposite to the first direction, and a switching element for regulating the voltage to be supplied to the motor to change a speed of the motor rotation;

a motor drive circuit controller for outputting a command value to the motor drive circuit, and a first branch circuit provided between the motor and the first switch and a second branch circuit provided between the motor and the second switch, wherein each of the first and second branch is connected to the ground through a diode such that the diode is connected with its anode on the ground side.

* * * * *